(12) United States Patent
Weber et al.

(10) Patent No.: US 6,888,859 B2
(45) Date of Patent: May 3, 2005

(54) COMPENSATION OF THERMAL OPTICAL EFFECTS

(75) Inventors: Heinz Weber, Kehrsatz (CH); Thomas Graf, Urtenen (CH)

(73) Assignee: Universitat Bern, Bern (CH)

( * ) Notice: Subject to any disclaimer, the term of this patent is extended or adjusted under 35 U.S.C. 154(b) by 152 days.

(21) Appl. No.: 09/886,385

(22) Filed: Jun. 22, 2001

(65) Prior Publication Data

US 2002/0021724 A1 Feb. 21, 2002

(30) Foreign Application Priority Data

Jun. 23, 2000 (EP) .............................. 00810551

(51) Int. Cl.$^7$ .............................. H01S 3/04; H01S 3/08
(52) U.S. Cl. .............................. 372/34; 372/92; 372/98; 372/101
(58) Field of Search .............................. 372/34, 36, 92, 372/98, 101

(56) References Cited

U.S. PATENT DOCUMENTS

| | | | |
|---|---|---|---|
| 3,434,779 A | | 3/1969 | Damen et al. |
| 3,577,098 A | | 5/1971 | Winston |
| 3,609,584 A | | 9/1971 | Stitch et al. |
| 3,662,281 A | | 5/1972 | Koechner |
| 4,848,881 A | * | 7/1989 | Kahan et al. ............... 359/288 |
| 5,386,427 A | * | 1/1995 | Zayhowski .................. 372/34 |
| 5,673,281 A | * | 9/1997 | Byer ............................. 372/3 |
| 5,751,750 A | * | 5/1998 | Friede et al. ................. 372/34 |

OTHER PUBLICATIONS

T. Y. Cherezova et al., "Active Correctors as the Alternative to Graded Phase Mirrors—$CO_2$ and YAG Laser Beam Formation," Institute of Laser Information Technologies, Russia, Jul. 12–16, 1999, pp. 187–192.

Alexis Kudryashov et al., "Bimorph Mirrors for Correction and Formation of Laser Beams," Adaptive Optics for Industry and Medicine Group, Institute on Laser and Information Technologies, Russia, Jul. 12–16, 1999, pp. 193–199.

C. Stewen et al., "Yb:YAG thin disk laser with 1 kW output power," Trends in Optics and Photonics, TOPS vol. 34, Feb. 13–16, 2000, pp. 35–41.

Koch, Optics Communications, 140, pp. 158–164 (1997).

Moshe et al. "Enhanced Correction of Thermo–Optical Aberations in Laser Oscillators", pp. 181–186.

Jackel et al., SPIE, vol. 3611, pp. 42–48 (Jan. 1999).

Kudryashov, SPIE, vol. 3611, pp. 32–40, (Jan. 1999).

Kugler et al., "High–Power Solid–State Laser With Bireringence Compensation and Adaptive Resonator Mirror", pp. 149–154.

Flath et al., "Development of Adaptive Resonator Techniques for High–Power Lasers", pp. 163–168.

* cited by examiner

*Primary Examiner*—Don Wong
*Assistant Examiner*—Leith Al-Nazer
(74) *Attorney, Agent, or Firm*—Birch, Stewart, Kolasch & Birch, LLP

(57) ABSTRACT

A method for compensating thermal optical effects in the beam path of an arrangement containing optical components uses, for the purpose of optical compensation in the beam path, optical elements which have different material properties in cooperation. For the purpose of compensation, heating by means of radiation absorption, radial thermal conduction for generating a power-dependent temperature distribution, and/or thermal dispersion for generating a thermal lens are distributed over the different elements.

22 Claims, 2 Drawing Sheets

COMPENSATION OF THERMAL OPTICAL EFFECTS

TECHNICAL FIELD

The invention relates to a method for compensating optical thermal effects, an optical unit for this purpose, and an optical arrangement.

PRIOR ART

If optical elements are heated, their optical properties (refractive index, external contour) are generally changed, and this entails variations in the phase front of a beam guided in such elements (thermal lens, thermal birefringence). Thermal optical effects are chiefly extremely disruptive in the case of optical high-performance oscillators, since they worsen the beam quality of the high-performance laser beam to be generated (beam deformation, stress birefringence, beam deflections etc.). The thermal lensing effect and the optical aberrations are caused by anisotropic temperature distribution in the optical medium.

An example for the elimination of thermal optical effects, in particular, continuously operating high-performance $CO_2$ laser resonators is given in the publication by A. V. Kudryashov entitled "Intracavity Laser Beam Control", SPIE Conf. on Laser Resonator II, San Jose, Calif., pages 32–40; 1999. The compensation is undertaken here actively by means of what is called adaptive optics. The adaptive optics is a mirror, whose surface contour can be adjusted, in the folded beam path inside the resonator. The adjustment is undertaken with the aid of electrically drivable piezoelectric ceramics. To control the drive, a small portion of the output radiation is coupled out, guided through a diaphragm and passed onto a thermal sensor. Depending on the received radiant power, the individual "mirror elements" are then driven via a control circuit so as to produce a mirror deformation which compensates surface deformations of the other optical components. An analogous adaptive adjustment of a mirror surface in a folded beam path in the resonator is described in L. Flath, J. An, J. Brase, C. Varrano, C. B. Dane, S. Fochs, R. Hurd, M. Kartz, R. Sawvel; "Development of Adaptive Resonator Techniques for High-Power Lasers", the publication relating to the conference entitled "Workshop on Adaptive Optics for Industry and Medicine", Durham (GB); page 163–168, 12–16 Jul. 1999.

The deformation of the laser resonator mirror for compensation purposes is described in N. Kugler, A. Vazquez, H. Laabs, H. Weber, "High-Power Solid-State Laser with Birefringence Compensation and Adaptive Resonator Mirror"; publication relating to the conference "Workshop on Adaptive Optics for Industry and Medicine", Durham (GB); page 149–154; 12–16 Jul. 1999.

Instead of varying the surface curvatures of optical components, in particular of mirrors, under active control, it is also possible for lenses to be displaced along the resonator axis in the laser resonator in order to compensate thermal effects at the active element. Such arrangements are described in St. Jackel, I. Moshe, R. Lavi; "High Performance Oscillators Employing Adaptive Optics Comprised of Discrete Elements"; SPIE Conf. On Laser Resonator II, San Jose, Calif., page 42–49; 12–16 Jul. 1999.

It is likewise possible to have a combination of a plurality of elements in a laser resonator which can be controlled as to their optical action. Thus, in I. Moshe, S. Jackel; "Enhanced Correction of Thermo-Optical Aberrations in Laser Oscillators", SPIE Conf. on Laser Resonator II, San Jose, Calif., page 181–186; 12–16 Jul. 1999 use is made of a lens which can be adjusted under control as to its distance from the laser resonator mirror and which has one Faraday rotator each upstream and downstream of the active medium.

DE-A 197 14 175 discloses a compensation of the thermal lens in the laser medium which is effective over the entire range of pumping power. The compensation of the thermal lens was achieved by virtue of the fact that a portion of the pumping light itself was used in the case of a longitudinally pumped active medium with its varying power in order to create an appropriate optical element which compensates the thermal lens in the active medium. This element was either a modified launch mirror or an additionally inserted element acting as a lens with a negative focal length (a positive one in the case of a negative thermal lens in the laser medium). It would also be possible to use a gaseous or liquid medium, located in a suitable cuvette, as the element. In addition to the pumping optical radiation, it would also be possible to send a portion of the generated laser power through an appropriate element of the resonator for compensation purposes.

The arrangement described in U.S. Pat. No. 3,434,779 served the purpose of keeping a laser power constant, this being achieved by using thermal optical effects.

Constancy is kept by using a nitrobenzene cell which widens a laser beam irradiated into it, doing so as a function of the radiant power. This widened beam then strikes a diaphragm which passes only the central beam region.

The compensation of thermal lensing effects in the laser resonator is described in the publication by R. Koch entitled "Self-adaptive optical elements for compensation of thermal lensing effects in diode end-pumped solid state lasers-proposal and preliminary experiments"; Optics Communications 140 (Jul. 15, 1997), pages 158–164. The compensation was performed by means of a resonator mirror whose mirror substrate absorbed the pumping radiation and had a large positive coefficient of thermal expansion. Specified as a further compensation option was an antireflection-coated plate which had a large negative thermal coefficient of the refractive index.

Further examples are described in U.S. Pat. No. 5,386,427, U.S. Pat. No. 5,751,750, U.S. Pat. No. 3,662,281, U.S. Pat. No. 3,609,584, U.S. Pat. No. 3,577,098 and U.S. Pat. No. 4,848,881.

OBJECT OF THE INVENTION

The object of the invention is to achieve, by contrast with the prior art, a substantially more effective compensation of the above-described optical changes caused by radial temperature gradients in optical components.

ACHIEVEMENT OF THE OBJECT

The above-named object is achieved by virtue of the fact that by contrast with the prior art, the various functions of absorption (heating by means of radiation absorption), radial thermal conduction (for generating a power-dependent temperature distribution) and thermal dispersion (for generating a thermal lens) are distributed over various, that is to say a plurality of elements with different material properties. By contrast with the prior art, there is now no need for one and the same element to fulfill all functions.

By contrast with the prior art, the aim here is direct heat transfer by means of intimate contact between an optical component and the compensation medium. The aim is preferably to achieve an approximately identical radial thermal distribution in the optical component and in the compensation medium.

Use may be made as compensation medium of materials which cannot transmit mechanical shear forces, or can transmit only negatively small ones. Such materials are liquids, gels and gases. However, it is also possible to use elastic media (solid bodies). However, in the case of solid bodies it is to be ensured that surfaces bearing against one another do so closely in optical terms, preferably being optically contacted. Optical surface effects should not arise in this case.

This type of compensation can be applied in the case of many optical components; however, they will preferably be used with lasers, in particular high-performance lasers, in which a good beam quality is desired.

Introduced into the beam path of an optical arrangement, which can be a laser oscillator or laser amplifier, for example, is an optical unit for compensating thermal optical effects in the beam path by means of optical components present therein. The optical unit located in the beam path has optical elements which have at least two different material properties and cooperate actively for the compensation, and on which, for the purposes of compensation, heating by means of radiation absorption, thermal conduction for generating a power-dependent temperature distribution, and thermal dispersion for generating a thermal lens can be distributed, preferably with a different effect.

One of the elements has an optical compensation space which is filled, in particular completely filled, with an optically transparent compensation medium. Optically transparent solid bodies are arranged as a further element with radiation absorption on both sides of the compensation space. The compensation medium makes such close thermal contact with the solid bodies arranged on both sides that good heat transfer is ensured from the solid bodies to the compensation medium. The optical compensation space can now only be the compensation medium when a solid body or a solid gel is involved; however, it can also be a space which is to be filled with the compensation medium if a liquid or a flowable gel is involved.

The compensation space is preferably designed in such a way that it extends perpendicular to the optical axis of the beam path. If the optical unit is used in a laser resonator, the components of the oscillator or amplifier are generally of circular cylindrical design, and cooling takes place at the periphery. Consequently, the compensation space is also designed with radial symmetry relative to the axis of the beam path, and the radial extent of the compensation space relative to the optical axis of the beam path is adapted to that of the neighboring solid bodies. It is preferred to select the radial dimensions of the compensation space and/or of the compensation medium to be identical to those of the adjacent neighboring solid body.

The solid body immediately neighboring the compensation medium will preferably be kept in a cooling holder which preferably completely encompasses the entire envelope of the solid body in intimate thermal contact. This produces a space-saving design with good efficiency.

If a material which transmits no mechanical shear forces is used as compensation medium, it is preferably possible to provide an expansion space which is connected to the compensation space and into which the compensation medium can undertake volumetric equalization in the event of thermal loading. Such an expansion space will be used chiefly in the case of a liquid or flowable compensation medium. Given a compensation medium of small volume, even only a small gas bubble is sometimes sufficient. If solid, non-flowing compensation media are used, it is possible to dispense with an expansion space, since the thermal expansion is small. The small expansion still present then pushes tightly against the neighboring optical components.

As already indicated above, an optical arrangement with such an optical unit is preferably designed as a laser resonator or laser amplifier in order, for example, to generate high laser output powers with good beam quality. In this case, the active medium is subdivided into partial media. A compensation space filled with a compensation medium is arranged as an optical element between the partial media and as a further optical element of the optical unit, each partial medium acting as an optically transparent solid body of the unit. Here, as well, solid and flowable media can be used as compensation medium. A compensation space into which flowable media can be filled will then be provided for such media. For non-flowable media, the medium itself will be produced with the required spatial dimensions.

The advantages of the invention and its fields of application emerge from the following description.

BRIEF DESCRIPTION OF THE DRAWINGS

Examples of the method according to the invention and of the subject matter according to the invention are explained below with the aid of the figures, in which.

WAYS OF IMPLEMENTING THE INVENTION

Figure 1:
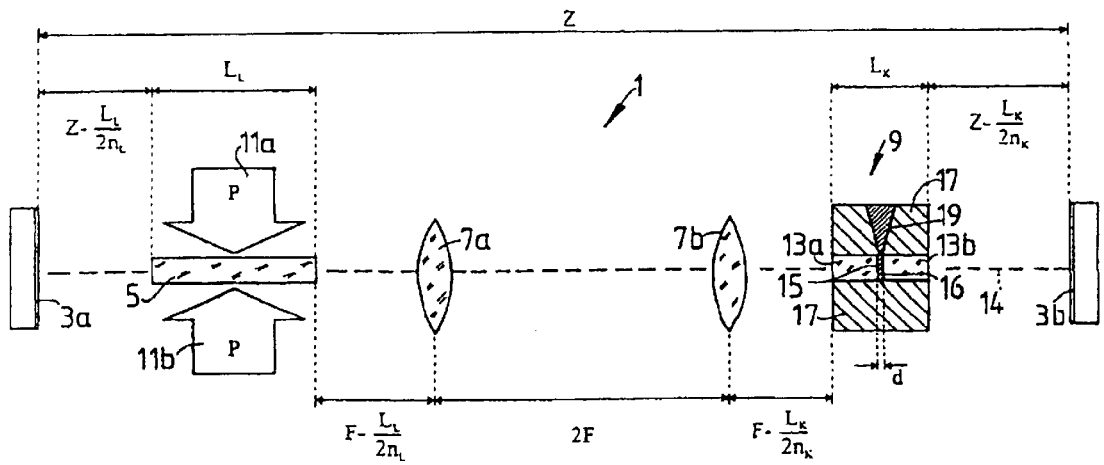
FIG. 1 shows a diagrammatic illustration of a laser resonator as an optical arrangement with a compensating optical unit.

The laser resonator 1, illustrated by way of example in FIG. 1, is designed as a symmetrical resonator with two parallel mirrors 3a and 3b. Arranged in the laser resonator 1 are a laser rod 5 as active medium, two lenses 7a and 7b and the optical unit 9 according to the invention. As indicated diagrammatically by the arrows 11a and 11b, the laser rod 5 is pumped optically in a transverse fashion. This pumping heats the laser rod 5 in its interior. It is cooled on its exterior. The result is the formation of a temperature gradient in the laser rod 5; what is termed a thermal lens has been formed. The refractive power of this thermal lens changes with the irradiated pumping energy and the generated laser radiation, which leads in turn to variations in the mode of oscillation of the laser resonator, and then further influences the generated radiant power and modes thereof. Such a behavior is extremely undesirable.

In the laser resonator 1 sketched in FIG. 1, the two lenses 7a and 7b are used for the purpose of optimum superimposition of the thermal lens in the laser rod 5 with that in the unit 9.

The unit 9 used for thermal compensation comprises here two laterally cooled, optically transparent cylindrical rods 13a and 13b and a narrow compensation space 15 with a compensation medium 16. The compensation space 15 extends at right angles to the optical axis 14 of the beam path produced by the laser rod 5. A liquid or a gel can be used as compensation medium. Use may be made as compensation materials of water, deuterated water or optical liquids and gels such as, for example, preferably for the visible spectral region OCF-446, OCF-452, OCF-463, OC-431 A-LVP, OC-440, OC-459, OC-462, OCK-433, OCK-451. These products are produced, for example, by the company Nye Optical Products. A further compensation material is a silicone "SYLGARD 182" from Dow Corning. Use will preferably be made of fully deuterated, chlorinated and fluorinated gels or liquids for the spectral region of longer wavelength adjoining the visible region. Of course, other liquids and gels can be used. It is also possible to use gases with suitable optical and thermal properties (refractive index, thermal dispersion). The advantages of liquids and gels are a very pronounced negative thermal dispersion (dn/dT) and the absence of thermally induced birefringence, since pressure gradients caused by thermal expansion cannot arise. These compensation media do not transmit any mechanical shear forces. An expansion space 19 is provided for volumetric equalization when the compensation medium is thermally loaded.

The rods 13a and 13b as well as the compensation medium 16 are cooled externally by a holder 17. Glass or, even better, a birefringent crystal comes into consideration as rod material for avoiding thermally induced depolarization. A birefringent crystal as rod 13a or 13b is particularly advantageous whenever the laser rod 5 is likewise birefringent. The crystal optic axes are to be aligned with one another.

The medium 16 is now heated to a small extent by absorption of a small portion of the transmitting laser radiation (residual absorption), and to the other extent by thermal conduction from the neighboring rods 13a and 13b into the medium 16. For their part, the rods are heated by absorption of a small portion of the laser radiation transradiating them. It would also be possible, in addition, to irradiate heat transversely from a heat source. In order to produce a power-dependent lens suitable for compensation in the compensation medium 16, too, power-dependent temperature distribution must be set up therein. This requires that the thermal conduction must take place in a predominantly transverse fashion from the material (transverse to the axis 14 of the beam propagation) Particularly in the case of compensation media which are narrow in the direction of beam propagation, predominant cooling over the end faces would have the effect that a temperature distribution set up is influenced chiefly by the intensity distribution of the transmitted beam and only to a slight extent by the power thereof. This process is avoided in the unit 9 by arranging the compensating medium between rods 13a and 13b which are heated by a slight absorption of the transmitted laser beam and are radially cooled. The desired power-dependent temperature distribution is now produced by the processes of heating, cooling and thermal conduction in the rods 13a and 13b and in the medium 16, and transmitted to the compensation medium 16 by thermal contact.

Instead of heating only the rods 13a and 13b, the heating can be performed by a low absorption of radiation in the compensation medium 16. Irrespective of whether the heating is predominantly produced by absorption in the compensation medium 16 or in the rods 13a and 13b, the desired power-dependent lens is set up owing to the thermal contact of the compensation medium 16 with the neighboring rods 13a and 13b, and to the radial cooling of the rods 13a and 13b. By contrast with the prior art, the different functions of absorption (heating), radial thermal conduction (for generating a power-dependent temperature distribution) and thermal dispersion (for generating the thermal lens) are distributed here over various elements with different material properties, and need not all be fulfilled by one and the same element.

The strength of the lens produced and, if appropriate, the absorption can be optimized by mixing various materials (for example water and heavy water), and by selecting a suitable thickness d of the compensation space 15. By cooling the periphery of the rods 13a and 13b with the aid of a holder 17 which encompasses them and which likewise cools the compensation medium 16 externally, a power-dependent, radially decreasing temperature distribution is produced, which leads to a power-dependent lens because of the thermal dispersion of the compensation medium 16. The temperature distribution in the compensation medium 16 is approximately equal to that in the neighboring rods 13a and 13b because of the small dimension of the thickness of the compensation space 15.

The compensation medium 16 and the rods 13a and 13b preferably have the same refractive index. As a result of this, no Fresnel reflections occur at the interfaces between the rod end face and compensation medium 16, and a deformation based on the thermal expansion of the rods 13a and 13b does not lead to a lensing effect. The Fresnel reflections could certainly be suppressed by an antireflection coating, but this would entail making the unit 9 more expensive. The liquids and gels listed above are particularly suitable, because their refractive index can be set.

The compensation space 15 can have two plane-parallel boundary surfaces (end faces of the rods 13a and 13b). However, it is also possible to undertake specific shaping such that even the higher aberrations, occurring in the laser rod 5, of the thermal lens can be adaptively compensated.

Given a sufficiently high thermal dispersion of the compensation medium 16, the thickness d of the compensation space 15 can be selected to be so small that no convection occurs. Specifically, convection would lead to striations. The convection can be avoided by selecting the viscosity suitably, and this is possible with the abovementioned materials by using suitable additives.

Data on the arrangement of the individual components are illustrated in FIG. 1. Here, the laser rod 5 is an Nd:YAG with a refractive index of $n_L=1.82$, a length of $L_L=50$ mm and a diameter of 4 mm. One end face of the laser rod 5 has an axial distance of $Z-L_L/2n_L$ from one resonator mirror 3a. Z is the distance between a resonator mirror 3a or 3b and the principal plane of the thermal lens. The magnitude of Z influences the mode magnitude and the stability range of the laser resonator 1. Z=80 mm. The focal length F of each lens 7a and 7b is 100 mm. The optical unit 9 has an axial length $L_K$ of 20 mm. The rods 13a and 13b are made from glass with a refractive index of $n_K=1.5$ and a diameter of 4 mm. The thickness d of the compensation space 15 is smaller than 1 mm. OCF-446 has been used here as compensation medium 15.

If the thickness d is selected to be substantially larger, the viscosity of the compensation medium must also be increased, or a solid body must be used in order for there to be no convection accompanied by striations.

A long path Z produces a larger mode diameter of the generated laser radiation, and thus a better beam quality, and this can be achieved by a lens placed additionally in the resonator. The distances Z between the resonator mirror 3a or 3b and the principal plane of the thermal lens need not be selected to be equal on the left and right in the resonator 1. Then, the two resonator mirrors 3a and 3b need not be of planar design; they can also be arcuate. All that is involved here is one of many design variants, all of the optical components being variable.

The rods 13a and 13b can, of course, also have a cross section which is square, cuboid or of regular or irregular polygonal design. Again, the cross sectional contour can vary over the rod length. The rod length can be greater than the transverse rod dimension, but also substantially smaller than this (for example thin disks).

Instead of a solid rod 5 as active medium, it is also possible to use another amplifier medium (discharge tube [gas laser], liquid [dye laser], . . . ). The compensation of optical thermal effects is also not limited to laser resonators; it can also be used in the case of mechanisms based on nonlinear optical processes (frequency doubling, parametric amplification and oscillation, . . . ).

Figure 2:
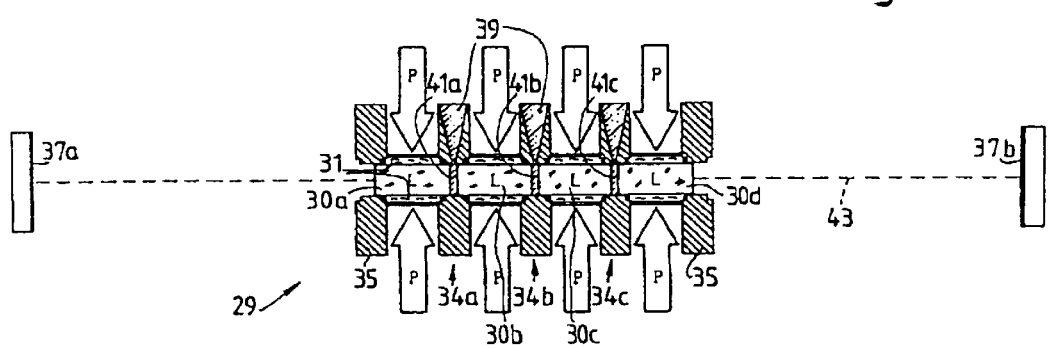
FIG. 2 shows a variant of the illustration in FIG. 1, an active laser medium being split here into component elements, and the optical compensation being undertaken immediately between these elements.

A further design variant of a laser resonator 29 is illustrated in FIG. 2, a laser rod having been subdivided here into a plurality of small partial rods 30a to 30d, between which compensation is then undertaken. By analogy with FIG. 1, a compensating optical unit 34a to 34c now comprises in each case the two neighboring optically transparent solid bodies, that is to say the partial rods 30a and 30b, 30b and 30c, and 30c and 30d. The compensation medium 39 is then arranged between the end faces of the neighboring partial rods. The partial rods 30a to 30d are provided externally with a cooler 31, which simultaneously cools the compensation medium 39 in the compensation units 34a to 34c with the aid of the holders 35 thereof. The resonator mirrors are marked here with 37a and 37b.

Owing to the heating in the laser rods and to the lateral cooling, a power-dependent temperature distribution, and thus a power-dependent positive thermal lens are set up in the partial rods 30a to 30d. Owing to the thermal contact between the end faces of the thermal rods 30a to 30d, this temperature distribution in the partial rods 30a to 30d is transmitted to the compensation medium, marked here with 39. As a result, a negative thermal lens, which compensates the positive thermal lens of the partial rods 30a to 30c, is produced in the compensation spaces 41a to 41c by the compensation medium 39 located there. There is no need in the compensation medium either for absorption of the laser power or of the pumping radiation. However, it is also possible to incorporate controlled absorption of the pumping light or of the laser radiation in the compensating medium. To be specific, all media absorb as a rule.

Intrinsically birefringent material, such as $Nd:YVO_4$, for example, is preferably used for the laser rods. In that case, disturbing thermally induced birefringence does not occur either in the partial rods 30a to 30c or in the compensation medium. The optical axis of the partial rods 30a to 30c is aligned at right angles to the resonator axis 43. In order to average out any possible asymmetry in the thermal lens caused by the anisotropy of the material of the partial rods 30a to 30c, the partial rods are arranged such that the optical axes are twisted in each case by 90° relative to one another in neighboring partial rods. In addition, the polarization of the transmitted laser radiation can then likewise be rotated by 90° between the individual partial rods 30a to 30c by suitable optical elements. The amplification of the laser radiation can be optimized in this way (anisotropy of the crystals). In addition, it would also be possible as an alternative to design the end faces of the partial rods in an arcuate fashion. Quartz rotators must be used if no birefringence occurs.

It will be preferred here to design the thickness of the compensation spaces 41a to 41c to be under 1 mm (for example 0.5 mm to 1 mm). The length of the partial rods can be a few millimeters to a few centimeters in the case of a typical rod diameter of 4 mm. Z will typically be selected between 20 mm and 100 mm.

What has been set forth above with reference to the heat transfer and the geometry for the rods 13a and 13b is also valid mutatis mutandis for the partial rods 30a to 30d.

Transverse pumping of the laser rod 5 or 30a to 30d is illustrated in FIGS. 1 and 2. Of course, it is also possible to use longitudinal pumping or other exciting mechanisms (gas discharge, RF excitation, gas dynamic, electronic, electric excitation, electron gun, . . . ) of the laser medium.

Figure 3:
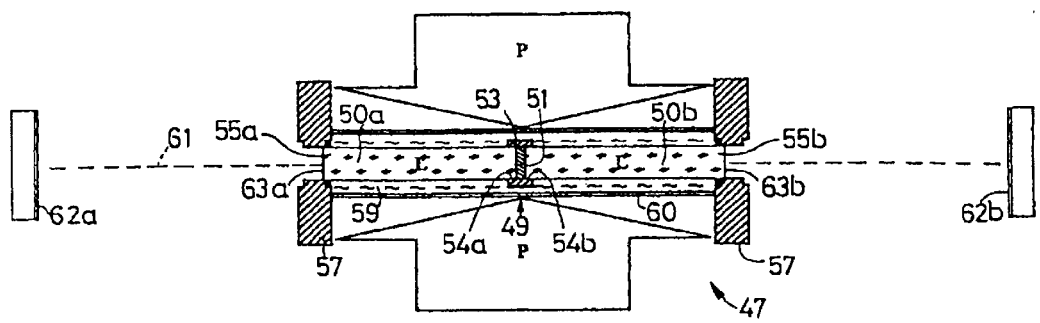
FIG. 3 shows a variant of the exemplary embodiments illustrated in FIGS. 1 and 2.
Figure 4:
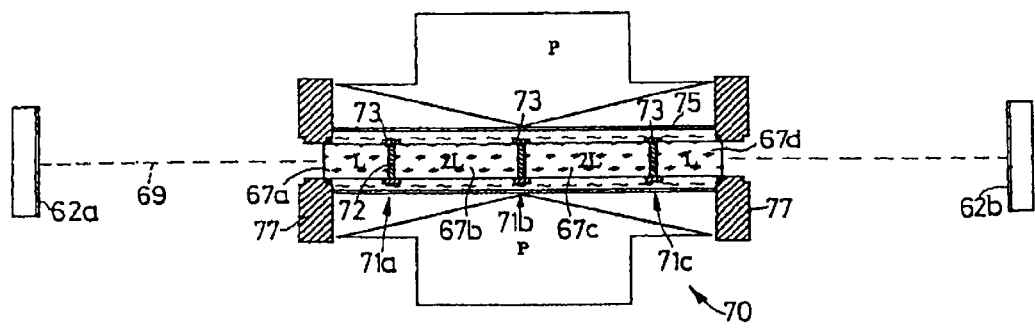
FIG. 4 shows a variant of the optical arrangement illustrated in FIG. 3, there being a plurality of optical compensation elements, however.

A variant of the optical arrangements shown in FIGS. 1 and 2 is illustrated in FIGS. 3 and 4. The variants illustrated here are simpler in their mechanical design. They can be used both for flowable and for non-flowable compensation materials. An exemplary use of the non-flowable compensation materials is described below.

A laser resonator 47 similar to that in FIG. 2 is shown in FIG. 3. However, the laser resonator 47 exhibits substantial differences by comparison with the laser resonator 29. Here, a solid body, preferably an elastomeric material, specifically the two-component gel OCK-433 mentioned above is used, in the cured state, as a unit 49 compensating thermal effects.

A double laser rod 50a/50b is arranged as active medium in the laser resonator 47, the two rods 50a and 50b being separated from one another by the compensating unit 49. The compensating unit 49 has a compensating medium 51, here the cured OCK-433, which is surrounded by a transparent sleeve 53 in which one end region 54a or 54b of the two end regions of the two rods 50a and 50b is plugged in each case. The cured OCK-433 serves firstly as compensation medium, and secondly also as a (cured) adhesive which lends the overall arrangement a stable coherence. The sleeve 53 is fabricated from sapphire, for example. Sapphire is transparent and has a very good thermal conductivity. Since the laser rods 50a and 50b generally have a circular cross section, the sleeve 53 is also designed with a circular cross section. The end regions 55a and 55b, not plugged in the sleeve 53, of the laser rods 50a and 50b are held in a holder 57 in a similar way as the arrangement in FIG. 2. The two laser rods 50a and 50b as well as the sleeve 53 are situated inside a transparent tube 60, which is filled with a cooling liquid 59 and which is likewise held in the holder. The two laser rods 50a and 50b as well as the sleeve 53 are cooled at their envelope by the cooling liquid 59. As is indicated by the two arrows P, the two rods 50a and 50b are pumped transversely in optical terms. The two resonator mirrors 62a and 62b are arranged at right angles to the optical resonator axis 61 in a fashion distanced from the outer end faces 63a and 63b, respectively, of the rods.

A very good thermal contact between the rod end faces and the compensating medium 51 is important. If, for example, the two-component gel OCK-433 is used, this can be introduced while still liquid between the rod end faces. The gel is subsequently cured, forming a good thermal contact.

If use is made of elastomeric compensation media, they can be pressed over the adjacent laser rods 50a and 50b by means of the holder.

If, instead of an elastomeric material, use were made of a material with a higher modulus of elasticity, it would be necessary for the end faces and the assigned surfaces of the medium to be produced in a fashion adapted to one another in such a way that no "air transition" remains; optical contact would have to be made between the two neighboring surfaces. As regards heating (absorption), radial thermal conduction (for producing a power-dependant temperature distribution) and thermal dispersion (for producing a thermal lens), the same applies for this arrangement as for the arrangement previously described.

FIG. 4 shows a further design variant, which is constructed in a way similar to that illustrated in FIG. 3. However, here the active medium is split into four rods 67a to 67d aligned with one another. The optical axis of the laser rods 67a to 67d coincides with the optical axis 69 of the laser resonator 70. The two middle rods 67b and 67c are designed with the same length; likewise the two outer ones 67a and 67d. Each of the outer rods 67a and 67d is only half as long as each of the two middle rods 67b and 67c. Also present are three compensating units 71a, 71b and 71d for compensating thermal optical effects which comprise a compensating medium 72 and a sleeve 73. The arrangement relating to the laser rod end faces is undertaken in a way similar to the design in FIG. 3. Here, as well, the laser rods 67a to 67d and the sleeves 73 of the units 71a to 71c are cooled in a way similar to FIG. 3 by a liquid 76 flowing in a transparent tube 75. The holder 77 for the tube 75 and the laser rod arrangement—67a to 67d with 71a to 71c—corresponds to the holder 57 shown in FIG. 3.

If high laser output powers are to be generated, long laser rods are also generally selected. If split up into a plurality of laser rods by comparison with the arrangement in FIG. 3 this produces a better thermal optical compensation. What held for the laser rods 30a to 30c holds for the laser rods 50a and 50b and 67a to 67b.

As a rule, as a consequence of thermal optical conditions, a laser rod generates a thermally induced birefringence in the case of which a lower refractive index is produced for the radially polarized radiation component than for the tangentially polarized one. The compensating solid medium is now selected in the above exemplary embodiments in such way that the reverse effect is produced in the event of heating.

As already mentioned at the beginning, instead of the solid two-component gel OCK-433 it is also possible to use a liquid as compensation medium in the optical arrangement illustrated in FIGS. 3 and 4. A small gas bubble which does not disturb the beam path will then preferably be provided for the purpose of volumetric equalization. However, it is also possible to dispense with the volumetric equalization.

If solids, that is to say non-flowable materials are used as compensation media, it is possible to dispense with the sleeve 53 or 73 if the compensation medium behaves inertly relative to the cooling liquid.

What is claimed is:

1. Method for compensating thermal optical effects interacting with an optical beam in an arrangement containing optical components being traversed by said beam,
   wherein for the purpose of compensation in a beam path of said beam being situated at least three optical transparent elements having a close thermal contact being used in co-operation,
   adjacent elements of said at least three elements having different material properties,
   said different material properties are
      a different absorption for radiation of said beam,
      a different thermal conduction or
      a different thermal dispersion, said different material properties causing the following effects
      a heating by radiation absorption of said beam,
      a distribution of temperature dependent on said heating by said thermal conduction and
      creating a thermal lens for said beam by said thermal dispersion dependent on said temperature distribution;
   for the purpose of compensation said effects being distributed over said at least three elements and there is no need for only one and the same element to fulfill all said functions.

2. Method according to claim 1, wherein two not adjacent elements of said at least three optical elements are transparent optical solid bodies
   and at least one of said at least three elements between said optical solid bodies being a compensating medium;
   said optical solid bodies having a prescribed radiation absorption of the radiation of said beam by said absorption of the radiation of said beam and said thermal conduction said temperature distribution is created in said optical solid bodies,
   said temperature distribution being imprinted by said close thermal contact to said compensating medium for compensating thermal optical effects in said optical components and said adjacent elements, respectively.

3. Method according to claim 2, wherein said compensation medium and said adjacent solid bodies having peripheries, said peripheries are cooled to the same temperature.

4. Method according to claim 3, wherein said compensation medium and said adjacent solid bodies are cooled to the same temperature at their periphery in an encompassing fashion at the same radial distance from the axis of the beam path.

5. Method according to claim 2 for compensating thermal optical effects in a laser resonator,
   said optical beam being a laser beam oscillating in said laser resonator,
   said laser resonator having a pumping optical radiation,
   said at least three optical elements having also a prescribed absorption for said pumping optical radiation,
   said absorption for said pumping optical radiation being typically much stronger as compared to the absorption of the oscillating beam radiation,
   both of said absorptions creating said heat.

6. Optical unit which can be brought into a beam path of an optical arrangement for compensating thermal optical effects of optical components present in a beam of said beam path of the optical arrangement, comprising
   at least three optical transparent elements in said beam path for compensating
   said at least three optical elements having a close thermal contact,
   adjacent elements of said at least three elements having different material properties and cooperate effectively for said compensating,
   said different material properties are
      a different absorption for radiation of said beam,
      a different thermal conduction or
      a different thermal dispersion,
   said different material properties causing the following effects
      a heating by radiation absorption of said beam, a distribution of temperature dependent of said heating by said thermal conduction and creating a thermal lens for said beam by said thermal dispersion dependent on said temperature distribution; for the purpose of compensation said effects being distributable over said at least three elements and there is no need for only one and the same element to fulfill all said functions.

7. Optical unit according to claim 6, wherein
two not adjacent elements of said at least three optical elements are transparent optical solid bodies having a radiation absorption, and
at least one of said at least three elements between said optical solid bodies being a compensating element,
said compensation element having an optical compensating space being filled with an optically transparent compensating medium,
said compensating medium having close thermal contact to said adjacent optical solid bodies in a manner that good heat transfer from the solid bodies to the compensation medium is ensured.

8. Optical unit according to claim 7, wherein said compensation space extends perpendicular to the optical axis of the beam path.

9. Optical unit according to claim 7, wherein a radial extent of said compensation space relative to the optical beam path is identical to that of the adjacent solid bodies.

10. Optical unit according to claim 7, wherein the solid bodies adjacent to said compensation medium are held with the aid of a cooling holder.

11. Optical unit according to claim 10, wherein said cooling holder completely encompasses the entire envelope of the solid bodies in close thermal contact.

12. Optical unit according to claim 7, wherein
said compensation medium being a material which transmits no mechanical shear forces, and
an expansion space is connected to said compensation space into which said compensation medium can undertake volumetric equalization in the event of thermal loading.

13. Optical unit according to claim 7, wherein said optical compensation space is completely filled with said compensating medium.

14. Optical unit according to claim 7, wherein said compensation space extends radially symmetric to the optical axis of the beam path.

15. Optical arrangement having a beam path and an optical unit for generating or amplifying radiation having an optical active medium,
said radiation being a beam traveling at said beam path,
said unit being part of optical arrangement,
said optical active medium being divided into partial separated optical solid media,
said unit comprising at least three transparent optical elements,
two of said at least three elements situated at each side of an optical third element of said at least three elements being said partial optical solid media,
said optical third element being a compensation space filled with an optical transparent compensation medium,
said compensation medium having a close thermal contact to each of said adjacent partial optical solid media and being used in co-operation with said partial optical solid media,
said partial optical solid media and said compensation medium having different material properties and cooperate effectively for said compensating,
said different material properties are
a different absorption for said radiation of said beam,
a different thermal conduction or
a different thermal dispersion,
said different material properties causing the following effects
a heating by radiation absorption of said beam,
a distribution of temperature dependent on said heating by said thermal conduction, and
creating a thermal lens for said beam by said thermal dispersion dependent on said temperature distribution;
said optical solid media having a prescribed radiation absorption of the radiation of said beam by said absorption of the radiation of said beam and by said thermal conduction said temperature distribution is created in said optical solid media,
said temperature distribution
being imprinted by said close thermal contact to said compensating medium for compensating thermal optical effects in said partial optical solid media,
for the purpose of compensation said effects being distributed over said at least two partial optical solid media and said at least one compensation medium and there is no need for only one and the same optical element to fulfill all said functions.

16. Optical arrangement according to claim 15, having an optical pumping source generating a pumping radiation,
said partial optical media having peripheries,
said pumping radiation entering each of said partial optical media by said peripheries and being absorbed inside said optical media partially for pumping,
said absorption of said pumping optical radiation being typically much stronger as compared to the absorption of the radiation of said beam, therefore said different material properties of said at least two partial optical solid media and said at least one optical transparent compensation medium causing the following effects,
a heating by radiation absorption of said beam and said pumping radiation,
a distribution of temperature dependent on said heating by said thermal conduction and
creating a thermal lens for said beam by said thermal dispersion dependent on said temperature distribution,
by said absorption of the radiation and said thermal conduction said temperature distribution is created in said partial optical media,
said temperature distribution being imprinted by said close thermal contact to said compensating medium for compensating said thermal optical effects.

17. Optical arrangement according to claim 16, having cooling media,
said compensation medium having also peripheries,
said peripheries of said several partial optical media and of said compensation medium being cooled by said cooling media,
said pumping radiation passing said cooling media.

18. Method for compensating thermal optical effects in an arrangement containing optical components generating or amplifying radiation, said arrangement having a beam path for said generated or amplified radiation and including at least three optical transparent elements having close thermal contact, said radiation being radiated in a beam, adjacent elements of said at least three elements having different material properties, said different material properties are
  a different absorption for said radiation of said beam,
  a different thermal conduction or
  a different thermal dispersion, said different material properties causing the following effects
  a heating by radiation absorption of said beam,
  a distribution of temperature dependent on said heating by said thermal conduction and
  creating a thermal lens for said beam by said thermal dispersion dependent on said temperature distribution;

for the purpose of compensation said effects being distributed over said at least three elements and there is no need for only one and the same element to fulfill all said functions.

19. Method according to claim 18, wherein two not adjacent elements of said three optical elements are transparent optical solid bodies and at least one of said at least three elements between said optical solid bodies being a compensating medium, said optical solid bodies being active media and having a prescribed radiation absorption, said method further comprising:

by said absorption of the radiation of said beam and said thermal conduction said temperature distribution is created in said optical solid bodies, said temperature distribution being imprinted by said close thermal contact to said compensating medium for compensating thermal optical effects in said optical components and said adjacent elements, respectively.

20. Method according to claim 19, wherein said solid bodies have a prescribed absorption of a laser radiation in the beam path, said method further comprising:

cooling said compensation medium and said adjacent solid bodies to the same temperature at their periphery.

21. Method according to claim 20, wherein said cooling said compensation medium and said adjacent solid bodies to the same temperature at their periphery is in an encompassing fashion at the same radial distance from the axis of the beam path.

22. Method according to claim 19, wherein said arrangement containing optical components is a laser resonator, said laser resonator having a pumping optical radiation entering said solid optical active media and being absorbed inside said optical media partially for pumping, said absorption of said pumping optical radiation being typically much stronger as compared to the absorption of the radiation of the beam, therefore said different material properties of said solid optical active bodies and said optical transparent compensation medium causing the following effects, a heating by radiation absorption of said beam and said pumping radiation, a distribution of temperature dependent on said heating by said thermal conduction and creating a thermal lens for said beam by said thermal dispersion dependent on said temperature distribution, by said absorption of the radiation and said thermal conduction said temperature distribution is created in said solid optical active bodies, said temperature distribution being imprinted by said close thermal contact to said compensating medium for compensating said thermal optical effects.

* * * * *